May 3, 1927. 1,627,006
C. M. ANGLEMYER ET AL
CLUTCH
Filed Jan. 8, 1924
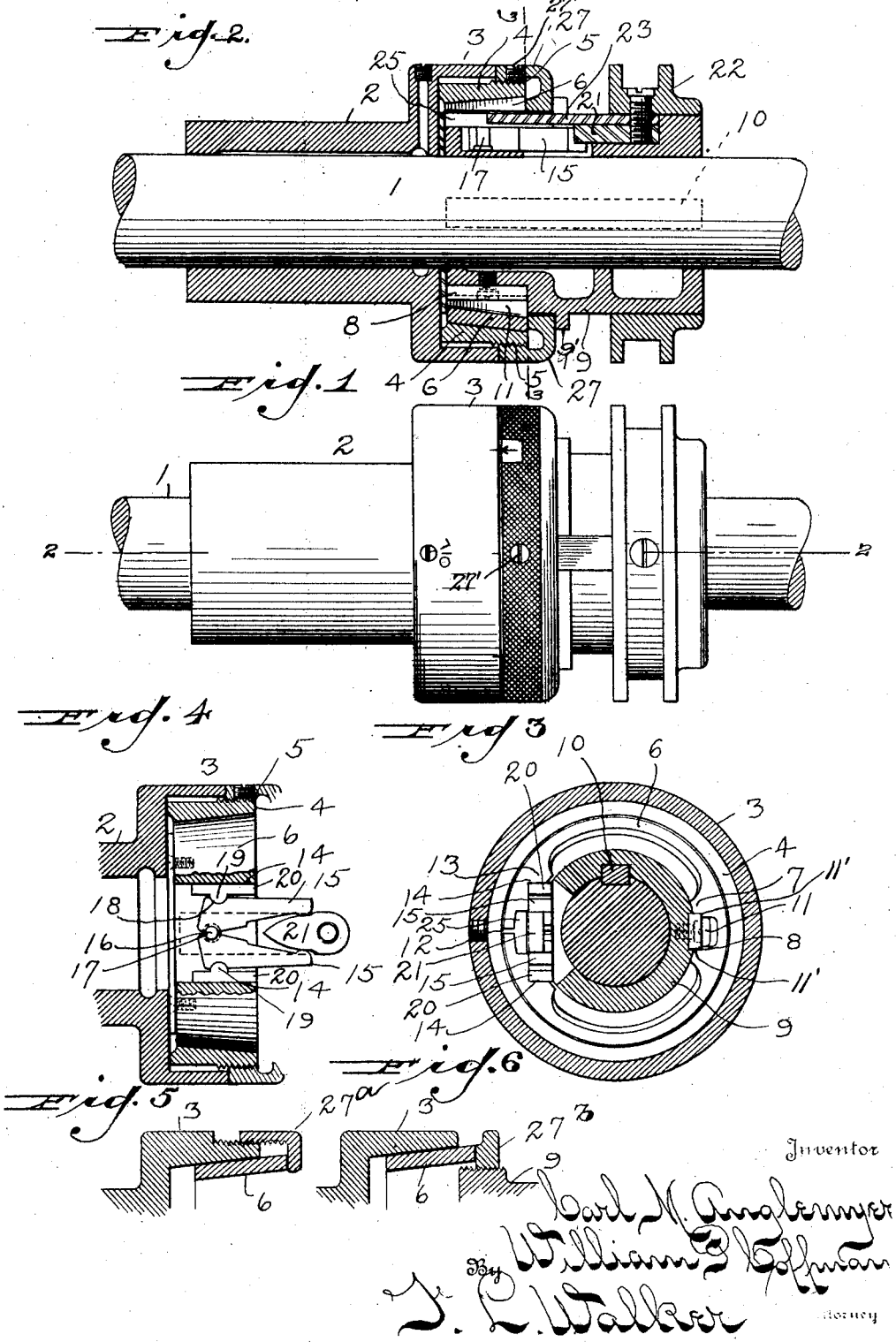
Inventor
Carl M. Anglemyer
William S. Kirwan
By T. L. Walker
Attorney Patented May 3, 1927.

1,627,006

UNITED STATES PATENT OFFICE.

CARL M. ANGLEMYER, OF DAYTON, AND WILLIAM P. COFFMAN, OF DUNKIRK, OHIO, ASSIGNORS TO THE EDGEMONT MACHINE COMPANY, OF DAYTON, OHIO, A CORPORATION OF OHIO.

CLUTCH.

Application filed January 8, 1924. Serial No. 684,987.

This invention relates to friction clutches of the expanding type, and more particularly to improved means for effecting the expansion of the clutch element and for effecting adjustment of the clutch parts to compensate for wear.

In this construction there is contemplated a split ring or male element of tapered or conical form having engagement within a correspondingly tapered female member or seating ring. The female member or seating ring is axially adjustable in relation to the tapered male member to compensate for wear or to vary the frictional engagement or pressure of the parts. The split ring or expanding male member is internally enlarged or increased in thickness to accommodate the key or other interlocking means by which it is connected with its support or with the driving or driven element as the case may be in order that the provision of such key way or recess for the interlocking elements may not weaken the clutch ring at such points.

This split ring or expanding male member is designed to afford substantially uniform resistance to expansion throughout its periphery thereby affording uniform and equal frictional engagement. Provision is made for expanding such split ring or male member with minimum effort by transmitting the wedging or camming effect of the actuating member to such split ring through a pair of operating levers, having engagement with the ends of the split ring and with the actuating member.

The object of the invention is to simplify the structure as well as the means and mode of operation of expanding clutches whereby they will not only be cheapened in construction, but will be more efficient in operation, uniform in action, easily and readily controlled and unlikely to get out of repair.

A further object of the invention is to provide improved means for adjusting the clutch parts to compensate for wear or to vary the pressure of their frictional engagement.

A further object of the invention is to provide improved means for expanding the clutch member, whereby the member may be expanded into driving engagement by minimum effort, the effect of such effort being multiplied by suitable leverage connections with the clutch member.

With the above primary and other incidental objects in view as will more fully appear in the specification, the invention consists of the features of construction, parts and combinations thereof, and the mode of operation or their equivalents as hereinafter described and set forth in the claims.

Referring to the accompanying drawings, wherein is shown the preferred, but obviously not necessarily the only form of embodiment of the invention. Fig. 1 is an exterior view of the assembled clutch mechanism embodying the present invention. Fig. 2 is a longitudinal sectional view of the assembled mechanism on line 2—2 of Fig. 1. Fig. 3 is a transverse sectional view on line 3—3 of Fig. 2. Fig. 4 is a detail sectional view illustrating the expanding means for the internal clutch ring. Figs. 5 and 6 illustrate modifications of the adjusting feature.

Like parts are indicated by similar characters of reference throughout the several views.

In the drawings 1 indicates the shaft and 2 a sleeve revolubly mounted upon the shaft and to be intermittently connected therewith. This sleeve may carry a pulley or any other element which it may be desired to intermittently connect with the shaft 1, for rotation in unison therewith. Obviously either the shaft 1, or the sleeve and its supported element may be the driver or the driven member. The sleeve 2 is provided with an enlarged recessed hub 3, which forms a housing for the clutch parts. Mounted within the housing or hub 3 and keyed thereto for rotation in unison with the hub and sleeve, but capable of independent axial adjustment is an internally tapered ring 4, forming the female element of the clutch or the seating ring. This external clutch ring or female element 4 is of such width that it projects somewhat beyond the housing or hub 3 and such projecting portion of the clutch ring 4 is externally screw threaded at 5. Concentrically located with the external clutch ring 4 is a split ring 6 having a tapered or conical periphery agreeing with the interior of the female ring 4 and constituting the expanding male element of the clutch. The split ring 6 is carried by the shaft mounted parts, while the ring 4 is carried by the hub 3 and sleeve 2, revolubly mounted upon the shaft. The rings 4 and 6 are therefore the direct coupling members, connecting the sleeve and shaft and consequently rotate in unison with corresponding parts. The split ring or male element 6 is internally enlarged at 7, to accommodate a key way or recess to receive a key or interlocking member 8, by which the split ring or expanding male member is interengaged with a sleeve 9 for unison rotation therewith. The sleeve 9 is fixedly mounted upon the shaft 1, and carried thereby. This connection may be by means of a key or spline 10, or by other suitable connection. By providing the internal enlargement 7 of the split ring or male member, the provision of the key way or slot for the key 8 will not weaken the expanding member at this point, in fact the bottom of the key way is recessed at 11 to reduce the thickness of the expanding ring beneath the key to approximately a dimension equal to that throughout other portions of the ring, thereby assuring uniformity of expansion, and equalizing the frictional engagement of the ring throughout the full circle of operation. The extension of the recess at 11 is of slightly less width than the key 8, thereby leaving shoulders or rabbets 11' at opposite sides of the recess in which the key 8 is seated.

Adjacent to the split 12 of the expanding ring the ring is enlarged internally at 13, to accommodate the expanding devices and is indented or rabbeted to afford shoulders 14, for their engagement. Interposed between the shoulders 14 is a pair of operating levers 15, interpivoted or fulcrumed one upon the other at 16. As a simple and efficient form of fulcrum, the levers 15 are provided with registering notches which engage the opposite sides of a fulcrum stud or pin 17, which is common to both the operating levers 15. On their outer faces the levers 15 are formed with semi-circular notches 18, which engage corresponding beads or flanges 19 upon pressure shoes 20 interposed between the operating levers 15 and the shoulders 14 of the expanding ring. The free ends of the operating levers 15 are engaged by a wedge or cam actuator 21, which is carried by a shift collar 22, slidingly mounted upon the sleeve 9. To protect the parts and as a guide for the shift collar in its to and fro movement, there is provided a flat finger or plate-like extension 23 upon the shift collar 22, which overlies the actuating cam or wedge 21 and the operating levers 15 and extends within a recess 25 located intermediate the shoulders or rabbets 14, in the expanding ring or male clutch member 6. The recess 25 and shoulders 14 form in effect double rabbets on opposite sides of the split in the expanding ring. An adjusting collar 27 is revolubly mounted upon the internal or shaft carried sleeve 9 and bears against the outer face of the internal or expanding ring 6, and at the same time has screw threaded engagement with the external thread 5 of the female or seating ring. The collar 27 is confined against axial movement between the hub or housing 3 at one side and a peripheral flange 9' on the sleeve at its opposite side. This permits free rotary movement, but prevents axial movement of the collar 27. The collar is locked in its adjusted position by a set screw 27' engaging the seating ring 4. By the revoluble adjustment of this collar 27 the female or seating ring 4 may be adjusted axially in relation to the male or inner ring 6. By such adjustment the male or inner ring 6 is caused to engage at greater or less depth within the tapered interior of the female or seating ring 4. Due to the different relative diameters of the seating ring and expanding ring or male member when engaged at different depths, due to their tapered or conical form, any wear or lost motion is compensated for or the parts are adjusted to effect their engagement with greater or less pressure. This ability to adjust the interengaging clutch members axially in relation one to the other independent of the relative expansion and contraction is quite an important feature.

While the construction heretofore described is to be preferred, it is obvious that various modifications of such adjusting features may be employed. Two such modifications are shown in the detail views 5 and 6. In Fig. 5 the adjusting ring 27$^a$ is threaded upon the housing or hub member, and is provided with an inward extending flange bearing against the outer lateral face of the expanding ring or male member 6. By adjusting the collar 27$^a$, the male member or expanding ring is pressed more deeply within the seating or female member. In this instance, the female member or seating ring 4 may be formed integral with the hub or mounting member. That is to say, the interior of the housing or mounting may be of tapered or conical form to perform the function of the seating ring 4. In the detail view Fig. 6, the adjusting collar 27$^b$ is shown screw threaded upon the shaft carried sleeve 9, and engages the expanding ring 6 to press it more deeply within the surrounding conical seat to take up lost motion or compensate for wear.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described our invention, we claim:

1. In a clutch device for engaging and disengaging two relatively rotatable elements, a pair of concentrically arranged clutch rings having correspondingly tapered engaging faces, one of said rings being expansible and contractable, means for controlling the expansion and contraction of said ring, and having simultaneous engagement with both rings, a concentric revoluble collar for axially adjusting said rings in relation to each other.

2. In a clutch mechanism for engaging and disengaging two relatively rotatable members, a cone clutch, one of the interengaging members of which is expansible and contractible, and means for regulating the expansion and contraction of said member, and a concentrically arranged revoluble adjusting collar having screw threaded engagement with one of such members and simultaneously bearing upon the other member for relatively adjusting said members to vary their relation axially to each other.

3. In a clutch mechanism, an internally tapered clutch ring, an externally tapered clutch ring, seated within the internally tapered ring, said inner ring being split, and means for expanding said inner split ring into driving engagement with the external interiorly tapered ring and an adjusting ring having screw threaded engagement with one of said rings and having abutting engagement on the other ring by the adjustment of which the rings are axially adjustable.

4. In a clutch mechanism, an internally tapered clutch ring, an externally tapered clutch ring seated within the internally tapered ring, said inner ring being split, and means for expanding said inner split ring into driving engagement with the external interiorly tapered ring, and a flanged ring having screw threaded engagement with the outer ring and having a shoulder thereon abutting upon the larger lateral face of the inner tapered ring for axially adjusting the outer ring in relation to the inner ring to compensate for wear and vary the engaging pressure.

5. An expanding cone clutch comprising two concentrically arranged clutch members having tapered engaging faces, and a concentrically arranged revoluble screw threaded adjustment collar having lateral abutting engagement with one of said members and by its revoluble adjusting serving to move one of said members axially in relation to the other and independent means for effecting relative expansion and contraction of one of the members in relation to the other.

6. In a clutch mechanism, an internally tapered clutch ring, an externally tapered expanding ring seated within the internally tapered ring, a mounting for said rings, the internally tapered external ring being exteriorly screw threaded and a revoluble adjusting collar having threaded engagement with the external interiorly tapered ring and simultaneously abutting engagement upon the inner ring by which the said rings may be axially adjusted in relation to each other.

7. In a clutch mechanism, an internally tapered ring, an externally tapered expanding ring engaging within the internally tapered ring, means for expanding the inner ring, a mounting for said rings, and a revoluble adjusting collar carried by the mounting and having operative engagement with both of the rings for adjusting such rings axially in relation to each other, to vary the engaging relation of the rings independent of the expansion of the inner ring.

8. In a clutch mechanism, an internally tapered ring, an externally tapered ring engaging within the internally tapered ring, one of said rings being expansible, and contractible, means governing the expansion and contraction of said ring, one of the rings being axially adjustable in relation to the other ring independent of such expansive and contractive movement, and a concentrically revolubly mounted abutment collar for one of the rings having lateral abutting engagement therewith, which by its concentric revoluble adjustment relative thereto effects such relative axial adjustment of said rings.

9. In an expanding clutch, a female clutch member, an expanding ring within the female member, a mounting for said ring, said ring being internally enlarged for engagement with said mounting, a recess formed in such interior enlargement, oppositely disposed rabbets formed in the inner faces of the recess, a key engaging in such rabbets and engaging with the mounting, the recess being extended beyond the bottom of such key leaving material having thickness substantially equal to that of the ring at the bottom of said recess.

10. In an expanding clutch, a female clutch member, an expanding ring within the female member, a mounting for said ring, spaced lugs projecting upon the interior of said ring, rabbets formed in the adjacent faces of the lugs, a key engaging in said rabbets and having driving engagement with the mounting, the portion of the ring intermediate the lugs being substantially equal in thickness to that beyond the lugs.

11. In an expanding clutch, a female member, an expanding ring within said female member, opposing spaced shoulders formed upon the interior of the ring, a pair of levers interpivoted one upon the other, and interposed between said shoulders and having outward bearing in opposite directions thereon, a reciprocatory wedge member introducible between the free ends of said levers for oscillating said levers outwardly about their interpivotal connection and by their pressure against said shoulders expanding said ring and a guide member overlying the reciprocatory wedge and levers, said guide member being movable in unison with the wedge and having guiding engagement with the expanding ring.

12. In a friction clutch, an exterior clutch member and an expanding split ring within the exterior clutch member, the adjacent ends of the split ring having rabbets formed therein, a reciprocatory actuating member movable axially relative to the clutch members for expanding the split ring, and a guide finger upon the actuating member having free reciprocatory movement between the rabbets of the adjacent ends of the split ring.

13. In a friction clutch, an exterior clutch member, an expanding split ring within the exterior member, oppositely disposed double rabbets formed in the adjacent ends of the split ring, spreading means engaging intermediate one pair of rabbets, an actuating element, and a guide finger for the actuating element, reciprocating freely intermediate the other pair of rabbets.

In testimony whereof, we have hereunto set our hands this 3rd day of January, A. D. 1924.

CARL M. ANGLEMYER.
WILLIAM P. COFFMAN.